US011533600B2

(12) United States Patent
Hastings et al.

(10) Patent No.: US 11,533,600 B2
(45) Date of Patent: Dec. 20, 2022

(54) METHODS AND SYSTEMS FOR DETECTING AND DISTRIBUTING ENCODED ALERT DATA

(71) Applicant: West Pond Technologies, LLC, Bolton, MA (US)

(72) Inventors: Steven D. Hastings, Bolton, MA (US); Nathan O. Ford, Berlin, MA (US)

(73) Assignee: West Pond Technologies, LLC, Bolton, MA (US)

( * ) Notice: Subject to any disclaimer, the term of this patent is extended or adjusted under 35 U.S.C. 154(b) by 343 days.

(21) Appl. No.: 16/864,803

(22) Filed: May 1, 2020

(65) Prior Publication Data

US 2020/0359190 A1 Nov. 12, 2020

Related U.S. Application Data

(60) Provisional application No. 62/844,450, filed on May 7, 2019.

(51) Int. Cl.
| | |
|---|---|
| *H04W 4/90* | (2018.01) |
| *H04N 7/20* | (2006.01) |
| *H04W 4/06* | (2009.01) |
| *G08B 3/10* | (2006.01) |
| *G08B 5/38* | (2006.01) |

(52) U.S. Cl.
CPC ............... *H04W 4/90* (2018.02); *H04N 7/20* (2013.01); *H04W 4/06* (2013.01); *G08B 3/10* (2013.01); *G08B 5/38* (2013.01)

(58) Field of Classification Search
CPC ..... H04W 52/26; H04W 76/11; H04W 80/02; H04W 36/00; H04W 60/04; H04W 12/10; H04B 7/185; H04B 10/118; G01S 19/115; H04L 45/22
See application file for complete search history.

(56) References Cited

U.S. PATENT DOCUMENTS

| | | |
|---|---|---|
| 5,515,378 A | 5/1996 | Roy, III |
| 5,619,503 A | 4/1997 | Dent |
| 6,771,625 B1 | 8/2004 | Beal |

(Continued)

FOREIGN PATENT DOCUMENTS

WO 2011149771 A2 12/2011

*Primary Examiner* — Iqbal Zaidi
(74) *Attorney, Agent, or Firm* — Blueshift IP, LLC; Cynthia M. Gilbert (57) ABSTRACT

A method for detecting and distributing alert data based upon both receiving alert data encoded in a terrestrial television broadcast transmission and receiving an identification of a location of a device includes receiving, by a first device in a plurality of devices in a mesh network, a terrestrial broadcast signal including at least one datacast packet. A second device in the plurality of devices receives a satellite transmission identifying a location of the second device. The method includes confirming, by a notification engine executed by a third device in the plurality of devices in the mesh network, receipt of both the satellite transmission and alert data encoded in the terrestrial broadcast signal. The method includes activating, by the notification engine, at least one alert module in the mesh network, upon confirmation of the receipt of both the satellite transmission and the alert data encoded in the terrestrial broadcast signal.

19 Claims, 7 Drawing Sheets

(56) References Cited

U.S. PATENT DOCUMENTS

| | | |
|---|---|---|
| 7,983,678 B2 | 7/2011 | Feher |
| 8,102,317 B2 | 1/2012 | Lee |
| 8,130,693 B2 | 3/2012 | Miller |
| 8,190,143 B1 | 5/2012 | Feher |
| 8,594,559 B2 | 11/2013 | Wichern |
| 8,789,116 B2 | 7/2014 | Miller |
| 9,019,929 B2 | 4/2015 | Berlin |
| 9,356,666 B1 | 5/2016 | Agee |
| 10,326,689 B2 * | 6/2019 | Liu .................. H04L 45/22 |
| 2007/0049260 A1 | 3/2007 | Hiromitsu |
| 2007/0298758 A1 | 12/2007 | Verma |
| 2011/0032149 A1 | 2/2011 | Leabman |
| 2012/0112901 A1 | 5/2012 | Chasko |
| 2013/0157610 A1 | 6/2013 | Vainik |
| 2017/0025737 A1 | 1/2017 | Roitberg |
| 2019/0124413 A1 | 4/2019 | Ng |
| 2019/0355264 A1 * | 11/2019 | Dolan ............. H04B 7/18508 |
| 2020/0314892 A1 * | 10/2020 | Wang ............. H04W 74/0833 |

\* cited by examiner

METHODS AND SYSTEMS FOR DETECTING AND DISTRIBUTING ENCODED ALERT DATA

CROSS-REFERENCE TO RELATED APPLICATIONS

This application claims priority from U.S. Provisional Patent Application No. 62/844,450, filed on May 7, 2019, entitled, "Methods and Systems for Detecting and Distributing Encoded Alert Data," which is hereby incorporated by reference.

BACKGROUND

The disclosure relates to detecting and distributing encoded alert data. More particularly, the methods and systems described herein relate to functionality for detecting and distributing alert data based upon receiving alert data encoded in a terrestrial television broadcast transmission and upon receiving an identification of a location of a device receiving the embedded data.

Conventional systems for disseminating alerts, such as earthquake alerts, typically require functionality for transmitting the alerts rapidly in order to allow recipients as much time as possible to react; such systems also typically rely upon devices that are easy for alert recipients to use and upon well-established existing communications networks. Some approaches have included receiving sensor data from sensors that can identify tremors and that can transmit alert data faster than the tremors can travel (e.g., in portions of a second) but once the alert data is received by a central location (e.g., a government or other official location), dissemination of the alert to the general public presents a challenge. Attempts have been made to transmit the alert data via mobile telephone but distribution time may be as much as four times longer, which makes this less desirable as a primary means of alerting the public in an emergency and presumes that the communications channels will not be overwhelmed by the number of alerts to be disseminated. Therefore, there is a need for distributing alert data and announcements regarding alert conditions quickly, reliably, and leveraging existing public infrastructure where possible.

BRIEF SUMMARY

In one aspect, a method for detecting and distributing alert data based both upon receiving alert data encoded in a terrestrial television broadcast transmission and upon receiving an identification of a location of a device receiving the embedded data includes receiving, by a first device in a plurality of devices in a mesh network, a terrestrial broadcast signal including at least one datacast packet. The method includes receiving, by a second device in the plurality of devices in the mesh network, a satellite transmission identifying a location of the second device. The method includes confirming, by a notification engine executed by a third device in the plurality of devices in the mesh network, receipt of both the satellite transmission and alert data encoded in the terrestrial broadcast signal. The method includes activating, by the notification engine, at least one alert module in the mesh network, upon confirmation of the receipt of both the satellite transmission and the alert data encoded in the terrestrial broadcast signal.

In another aspect, a system for detecting and distributing alert data based both upon receiving alert data embedded in a terrestrial television broadcast transmission and upon receiving an identification of a location of a device receiving the embedded data includes a mesh network, a notification engine, and an alert module. The mesh network includes a plurality of devices, wherein each device comprises a terrestrial broadcast signal receiver, a satellite transmission signal receiver, and an alert module. The notification engine is executed by at least a first of the plurality of devices, receives a notification that at least a second of the plurality of devices received a terrestrial broadcast signal including at least one datacast packet, receives a notification that at least a third of the plurality of devices received a satellite transmission identifying a location of the second device, and confirms receipt of both the satellite transmission and alert data encoded in the terrestrial broadcast signal. The alert module is executed by at least one of the plurality of devices, is activated by the notification engine, and transmits an alert based upon the alert data.

BRIEF DESCRIPTION OF THE DRAWINGS

The foregoing and other objects, aspects, features, and advantages of the disclosure will become more apparent and better understood by referring to the following description taken in conjunction with the accompanying drawings, in which.

DETAILED DESCRIPTION

The present disclosure relates to methods and systems for detecting and distributing encoded alert data. Existing infrastructure may provide functionality for detecting an alert condition (e.g., earthquake sensors embedded in the ground may identify a tremor in the ground and provide the identification or other sensor data to a central location that generates alert data) and for embedding alert data into datacast signals (e.g., embedded into digital packets that are transmitted with digital television signals). The methods and systems described herein provide novel, non-obvious functionality for receiving datacast signals (e.g., generated after detection of an alert condition), determining whether the received signals include an alert that applies to a physical location of the recipient of the signal, and generating alerts drawing attention to the alert condition.

Implementations of the methods and systems described herein may result in functionality for receiving, by a first device, a terrestrial broadcast signal including alert data in a datacast; receiving satellite transmissions identification a location of a second device; and confirming receipt of both of those before activating an alert. Unlike conventional systems that may, at most, use mesh networks to sense environmental events at the location of the mesh network devices and immediately issue an alert, implementations of the methods and systems described herein may delay activating an alert until the receipt of both a terrestrial broadcast signal that includes alert data in a datacast and satellite transmissions identifying a location of a particular device within an area identified by the alert data. In some embodiments, the methods and systems described herein may include functionality for detecting and announcing an alert condition, based upon alert data received from specially encoded terrestrial television broadcast transmissions and upon receiving device location identification data from satellite transmissions.

In one embodiment, the methods and systems described herein include use of a mesh network comprising a plurality of devices capable of communicating with each other via mesh communications (e.g., WiFi signals), each device including receivers for receiving a variety of transmitted signals, such as signals from GPS satellites and television towers. A user may acquire and install the devices in a variety of locations throughout a physical environment (such as, without limitation, the user's home, office, or other property). Since the transmission characteristics of the GPS satellite and terrestrial broadcast signals are very different, a single device installed at a single position within a single location is unlikely to receive both transmissions. However, multiple devices installed at a single location may significantly increase the odds that both of the requisite transmissions will be received by at least one of the devices installed within the location. Functionality for determining whether the received signals indicate that an alert of an emergency condition applies to the physical environment in which the mesh network resides may provide users with rapid, accurate information about relevant alerts.

Figure 1A:
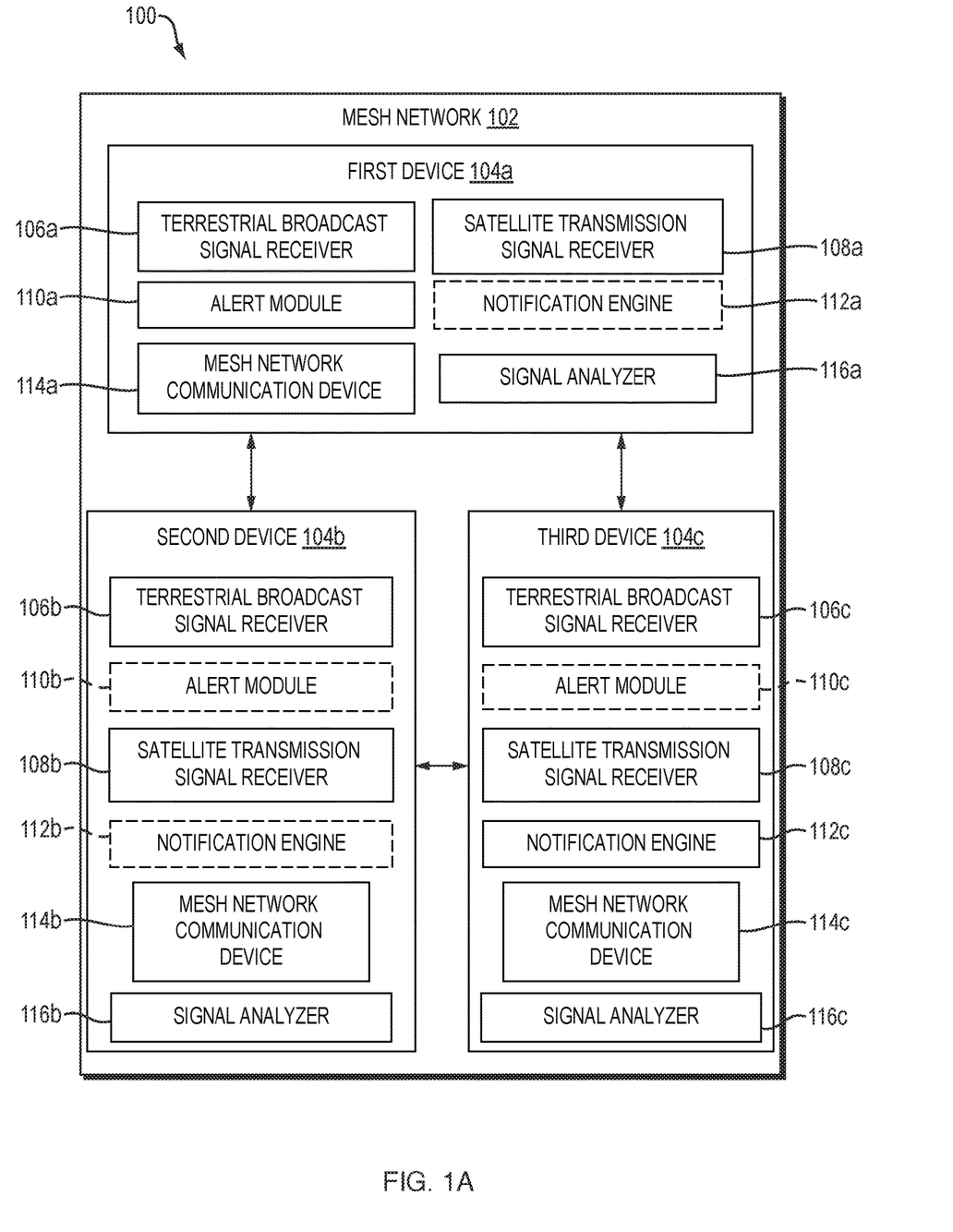
FIG. 1A is a block diagram depicting an embodiment of a system for detecting and distributing encoded alert data.

Referring now to FIG. 1A, a block diagram depicts one embodiment of a system 100 for detecting and distributing encoded alert data. The system 100 includes a mesh network 102, which itself includes a plurality of devices 104. The mesh network 102, as will be understood by those of ordinary skill in the art, may be a communications network made up of radio nodes organized in a mesh topology; the network is a form of wireless ad hoc network. Each device 104 includes a terrestrial broadcast signal receiver 106, a satellite transmission signal receiver 108, a mesh network communication device 114, and a signal analyzer 116. Each of the components on a device 104 may be in communication with each of the other components. At least one of the devices 104 and, as shown in FIG. 1A, optionally all of the devices 104 may execute an alert module no. At least one of the devices 104 executes a notification engine 112 and, as shown in FIG. 1A, optionally all of the devices 104 execute notification engines.

Each device 104 in the plurality of devices may be in communication with each of the other devices in the plurality of devices. Each device 104 in the plurality of devices may retransmit, over the mesh network 102, information regarding whether and when each device 104 receives information from one or more broadcast transmission sources (both terrestrial and satellite). Each device 104 in the plurality of devices may retransmit, over the mesh network 102, information that has been received and retransmitted by other receiving devices in the mesh network 102.

In some embodiments, the terrestrial broadcast signal receiver 106 includes a television antenna. In one of these embodiments, the terrestrial broadcast signal receiver 106 includes a very high frequency (VHF) antenna. In another of these embodiments, the terrestrial broadcast signal receiver 106 is an ultra-high frequency (UHF) antenna. As an example, and without limitation, the terrestrial broadcast signal receiver 106 may be provided as a loop. In other embodiments, the terrestrial broadcast signal receiver 106 includes a terrestrial radio antenna. The terrestrial broadcast signal receiver 106 may include functionality for receiving datacast television signals.

In some embodiments, the device 104 includes one or more terrestrial broadcast signal receivers 106 so that the device 104 may receive more than one type of signal. In one of these embodiments, the device 104 may include functionality for switching between a plurality of terrestrial broadcast signal receivers 106 as the device 104 scans for signals. In some embodiments, the device 104 utilizes a mechanical switch when an external antenna is connected.

In some embodiments, the satellite transmission signal receiver 108 includes functionality to receive global navigation satellite system (GNSS) signals. For example, the satellite transmission signal receiver 108 may be a Global Positioning System (GPS) module.

In some embodiments, the mesh network communication device 114 is a radio transmitter. The radio transmitter may be a transceiver. As will be understood by those of ordinary skill in the art, the mesh network communication device 114 may use common standards for communicating with other devices 1o4; such standards include, without limitation, 802.11a, b, and g. The mesh network communication device 114 may be a Bluetooth Low Energy (BLE) device. The mesh network communication device 114 may be a ZIGBEE device.

In some embodiments, the notification engine 112 is a software program. In other embodiments, the notification engine 112 is a hardware module. In some embodiments, the device 104 includes a computing device (not shown) and the computing device may execute the notification engine 112.

In some embodiments, the alert module no is a software program. In other embodiments, the alert module no is a hardware module. The device 104 may include a computing device (not shown) and the computing device may execute the alert module no. The device 104 may include a speaker or other output device and the alert module no may be in communication with, or include, the speaker. The alert module 110 may include at least one strobe light. The alert module 110 may include at least one light emitting diode. The alert module 110 may include a piezoelectric buzzer. As an example, the device 104 may include a computer storing an audio file and the alert module no may include functionality for directing the playback of the audio file through a speaker to announce an alert detected by the device 104 while flashing one or more lights. The audio file may include alert signals or other noises. The audio file may include instructions regarding recommended actions to take in an emergency.

In some embodiments, the signal analyzer 116 is a software program. In other embodiments, the signal analyzer 116 is a hardware module. In some embodiments, the device 104 includes a computing device (not shown) and the computing device may execute the signal analyzer 116. The signal analyzer may include functionality for extracting data that was datacast within the received terrestrial broadcast signal. As will be understood by those of ordinary skill in the art, a terrestrial broadcast signal, such as a television signal, includes a stream of digital packets for displaying audiovisual programming to users; a subset of the digital packets may be used to transmit additional data. The signal analyzer 116 may, therefore, include determining whether a received signal includes any datacast data and, if so, extract the datacast data from the signal.

A device in the plurality of devices in the mesh network 102 may include functionality for accessing other networks, either other mesh networks or networks of other types and/or forms. A device in the plurality of devices 104 in the mesh network 102 may include functionality for receiving cellular transmissions. A device in the plurality of devices 104 in the mesh network 102 may include functionality for accessing mobile telephone networks utilizing any protocol or protocols used to communicate among mobile devices (including tablets and handheld devices generally), including AMPS, TDMA, CDMA, GSM, GPRS, UMTS, or LTE. A device in the plurality of devices 104 may include the functionality of a mobile device (e.g., of a mobile phone). A device in the plurality of devices 104 may, therefore, include the functionality to communicate to a mobile telephone device on another network (e.g., to a device not on the mesh network 102); in such an embodiment, the device 104 may transmit, to the mobile telephone device, alert data.

A device in the plurality of devices in the mesh network 102 may further include a network interface to interface to other networks (not shown) through a variety of connections including, but not limited to, standard telephone lines, LAN or WAN links (e.g., 802.11, T1, T3, 56 kb, X.25, SNA, DECNET), broadband connections (e.g., ISDN, Frame Relay, ATM, Gigabit Ethernet, Ethernet-over-SONET), wireless connections, or some combination of any or all of the above. Connections can be established using a variety of communication protocols (e.g., TCP/IP, IPX, SPX, NetBIOS, Ethernet, ARCNET, SONET, SDH, Fiber Distributed Data Interface (FDDI), RS232, IEEE 802.11, IEEE 802.11a, IEEE 802.11b, IEEE 802.11g, IEEE 802.11n, 802.15.4, Bluetooth, ZIGBEE, CDMA, GSM, WiMax, and direct asynchronous connections). The network interface may comprise a built-in network adapter, network interface card, PCMCIA network card, card bus network adapter, wireless network adapter, USB network adapter, modem, or any other device suitable for interfacing the device 104 to networks outside the mesh network.

Figure 1B:
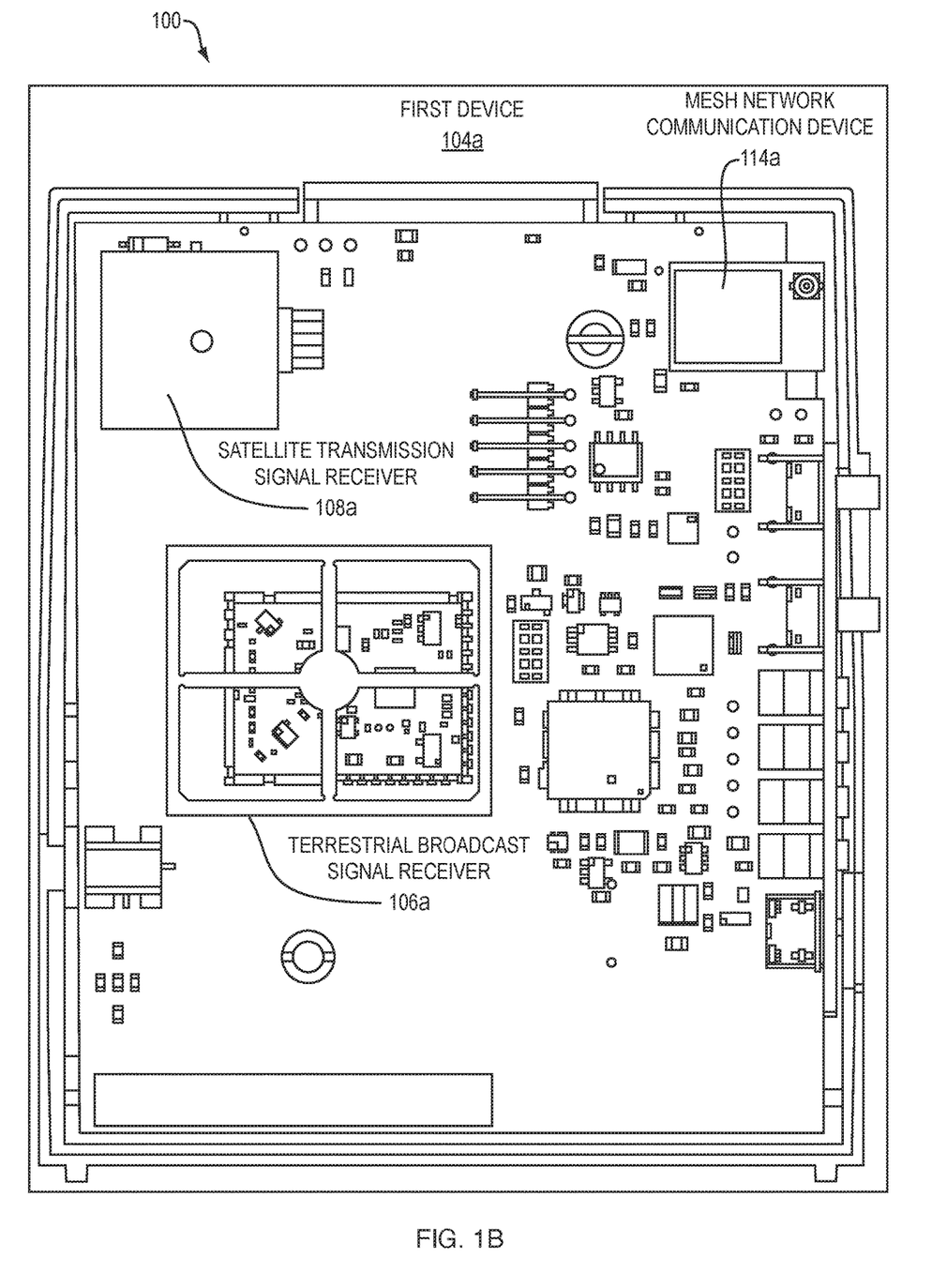
FIG. 1B is a rear view of an embodiment of a circuit board in a device for detecting and distributing encoded alert data.
Figure 1C:
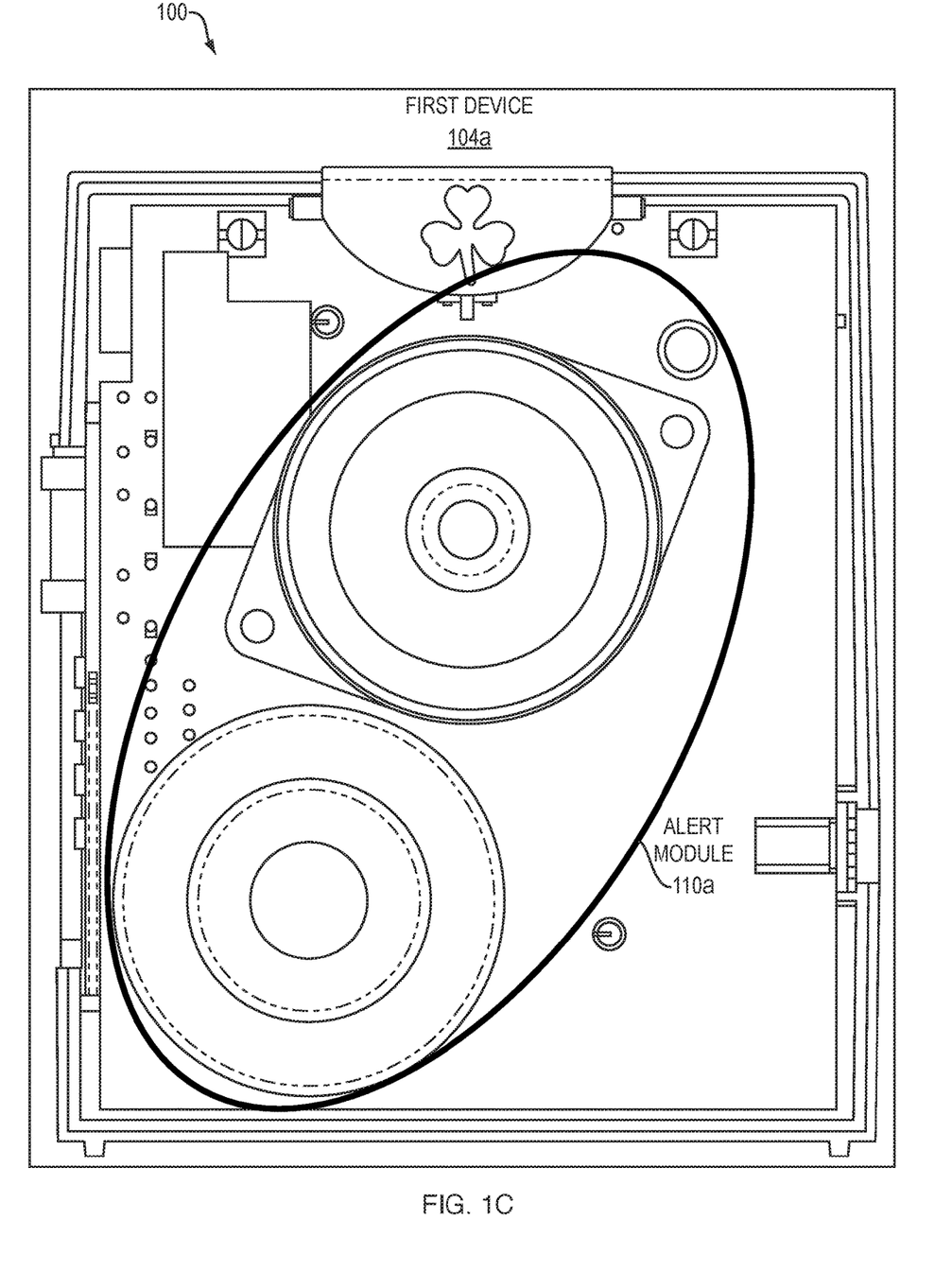
FIG. 1C is a front view of an embodiment of a circuit board in a device for detecting and distributing encoded alert data.

FIGS. 1B-1C depict embodiments of a circuit board in a device for detecting and distributing encoded alert data. FIG. 1B is a rear view of an embodiment of a circuit board in the device 104 for detecting and distributing encoded alert data. The terrestrial broadcast signal receiver 106a, the satellite transmission signal receiver 1o8a, and the mesh network communication device 1144a may be provided as a combination of software and hardware within a device 104. In the embodiment depicted by FIG. 1B, the hardware components of each of the terrestrial broadcast signal receiver 1o6a, the satellite transmission signal receiver 1o8a, and the mesh network communication device 114a are depicted and the software would be provided by one or more micro controller circuits. FIG. 1C is a front view of an embodiment of a circuit board in the device 104 for detecting and distributing encoded alert data. As shown in FIG. 1C, the alert module 110a may be provided by both hardware and software. The hardware components may include a speaker, a buzzer, and a strobe Light Emitting Diodes (LEDs) associated with it.

Figure 1D:
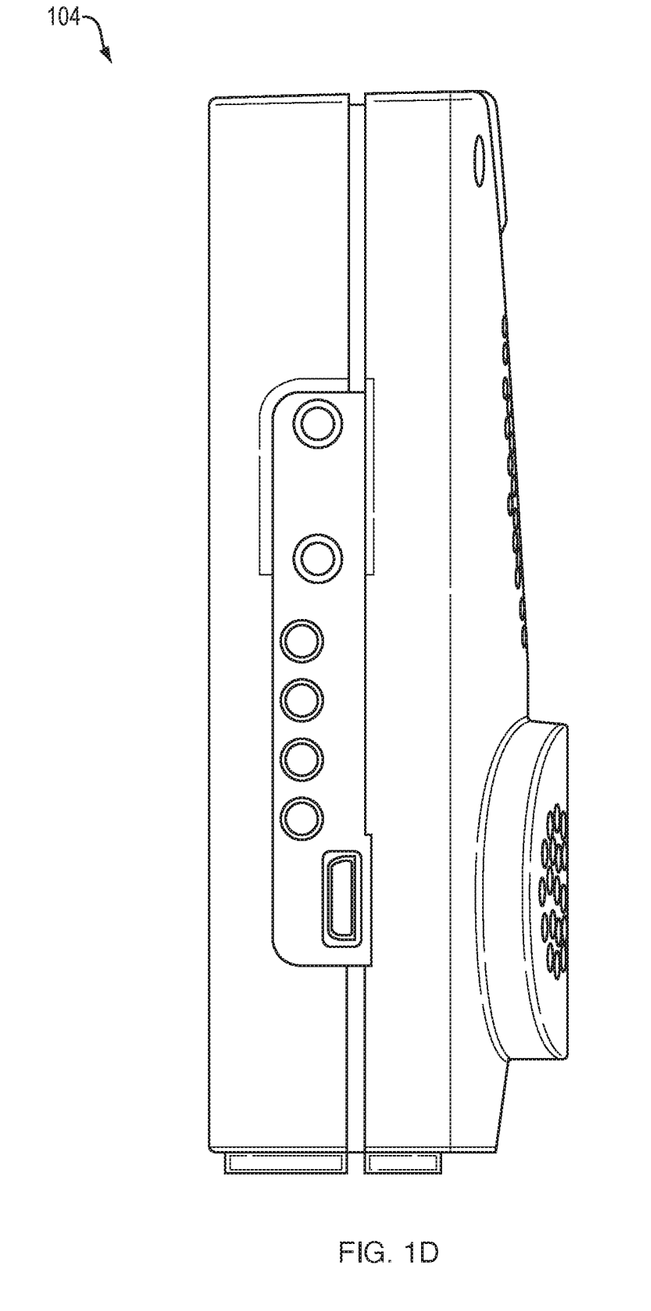
FIG. 1D is a left side view of an embodiment of a device for detecting and distributing encoded alert data.
Figure 1E:
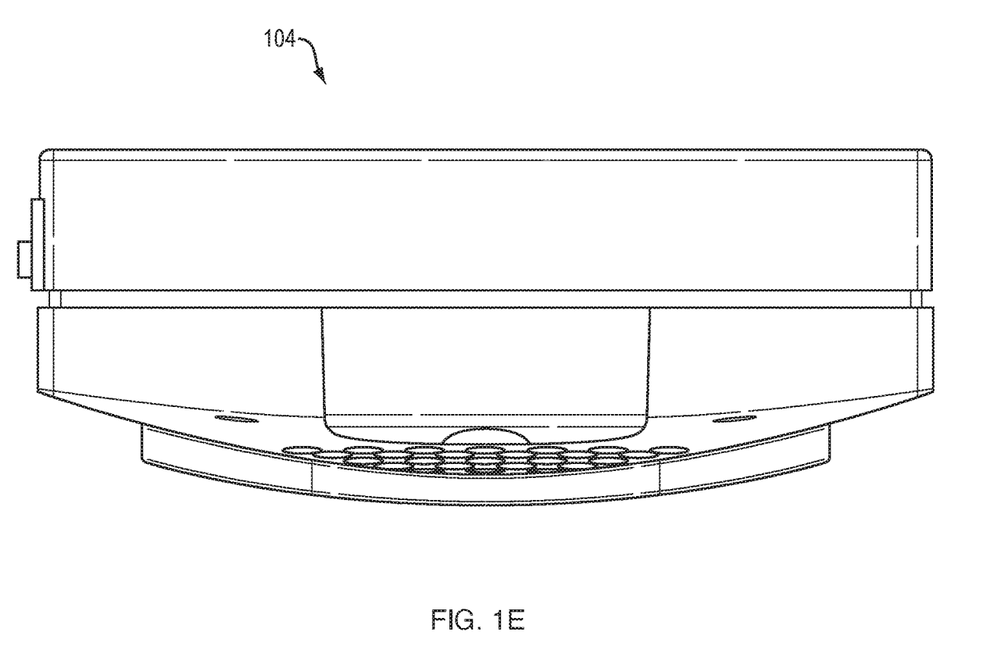
FIG. 1E is a top view of an embodiment of a device for detecting and distributing encoded alert data.

FIG. 1D depicts a left side view of an embodiment of a device 104 for detecting and distributing encoded alert data. As depicted in FIG. 1D, the device 104 may include one or more LEDs, a display of a level of signal strength, power input, and one or more buttons to extract status and configuration. Either on the left side (not shown) or the right side (not shown), the device 104 may include a connection to an external television antenna. FIG. 1E depicts a top view of an embodiment of a device for detecting and distributing encoded alert data.

Figure 2:
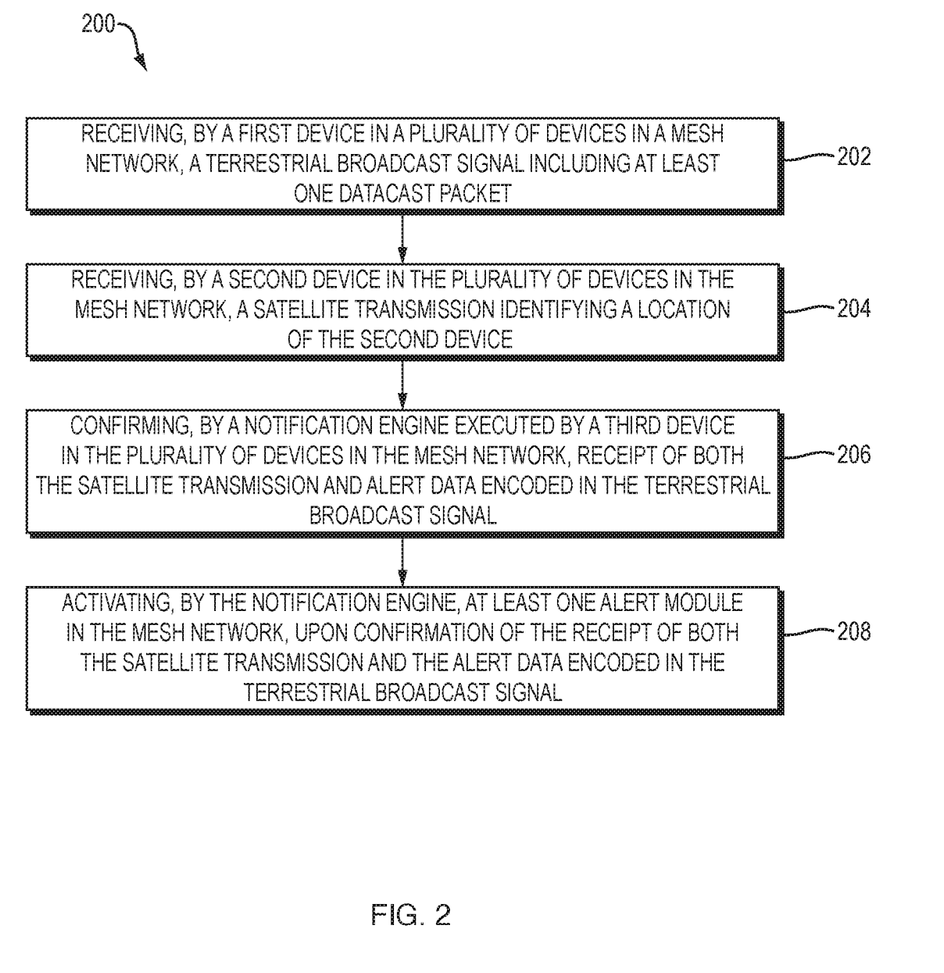
FIG. 2 is a flow diagram depicting an embodiment of a method for detecting and distributing encoded alert data.

Referring now to FIG. 2, a flow diagram depicts one embodiment of a method 200 for detecting and distributing encoded alert data. In brief overview, the method 200 includes receiving, by a first device in a plurality of devices in a mesh network, a terrestrial broadcast signal including at least one datacast packet (202). The method 200 includes receiving, by a second device in the plurality of devices in the mesh network, a satellite transmission identifying a location of the second device (204). The method 200 includes confirming, by a notification engine executed by a third device in the plurality of devices in the mesh network, receipt of both the satellite transmission and alert data encoded in the terrestrial broadcast signal (206). The method 200 includes activating, by the notification engine, at least one alert module in the mesh network, upon confirmation of the receipt of both the satellite transmission and the alert data encoded in the terrestrial broadcast signal (208).

When a device 104 is first powered on, the device 104 may search for signals and may continue to search until all of the signals are present (e.g., both satellite and terrestrial broadcast). In embodiments in which the device 104 includes a plurality of light emitting diodes (LEDs) on the unit, the LEDs may be used to indicate that the device 104 is searching for signals. Similarly, in embodiments in which the device 104 includes a plurality of light emitting diodes (LEDs) on the unit, the LEDs may be used to indicate that the signals are available, locally or via the mesh network 102 (that is, based on having received an indication from a second device 102 that the second device 102 has received one or more signals), the LED pattern may change to indicate that the device 104 is installed successfully. Additional LEDs or LED patterns may be used to show whether the unit is "linked" to the terrestrial broadcast signal, the satellite signal, and/or to the mesh network 102. The system 100 may also indicate a status of a device 104 via playback of an audio file (e.g., recorded speech indicating the status).

In some embodiments, the device 104 may include fewer or no LEDs and communications (including alerts and status updates) to a user of the device 104 may be performed via playback of an audio file instead. By way of example, the alert module 110 may include functionality for accessing a library of words (stored on, or accessible to, the device 104), selecting one or more words from the library of words and concatenating the selected words to create the audio file for playback. Continuing with this example, the alert module 110 may select a phrase such as "The status of the device is" and a phrase such as "connected" or "disconnected" and concatenate the words to create the audio file and then play through a speaker of the device 104 the contents of the file so that a user would hear "The status of the device is connected" or "The status of the device is disconnected." The alert module no may provide more than one type of status update. For example, the alert module no may create an audio file that when played back causes a user to hear "The status of the device is connected. The Last Earthquake was on Apr. 29, 2020. There are no active warnings in your area."

Referring now to FIG. 2, in connection with FIG. 1, and in greater detail, the method 200 includes receiving, by a first device in a plurality of devices in a mesh network, a terrestrial broadcast signal including at least one datacast packet (202). The terrestrial broadcast signal receiver 106a in the first device 104a may receive the terrestrial broadcast signal. The terrestrial broadcast signal receiver 106a may provide the received terrestrial broadcast signal to the signal analyzer 116a. The terrestrial broadcast signal receiver 106a may transmit, or direct the device 104a to transmit, to at least the third device 104*c* in the plurality of devices in the mesh network, a notification of receipt of the terrestrial broadcast signal including the at least one datacast packet. The terrestrial broadcast signal receiver 106*a* may transmit, or direct the device 104*a* to transmit, to each of the devices 104 in the plurality of devices in the mesh network, a notification of receipt of the terrestrial broadcast signal including the at least one datacast packet.

The signal analyzer 116*a* may receive the terrestrial broadcast signal from the terrestrial broadcast signal receiver 106*a*. The signal analyzer 116*a* may analyze the received signal to determine whether the received signal contains any datacast data. The signal analyzer 116*a* may analyze the received signal (for example, by analyzing a stream of datacasting packets received in the signal) to determine whether the received signal contains any datacast data encoding alert data (such as an indication of an emergency or other alert condition at a particular location at a particular date and time).

In some embodiments, the signal analyzer 116*a* may determine that there is information in the terrestrial broadcast signal that may be used by the signal analyzer 116*a* to differentiate a terrestrial broadcast signal that has alert capability from one that does not. The signal analyzer 116 may also determine that an alert within the terrestrial broadcast signal is signed to ensure authenticity. The signal analyzer 116 may also analyze alert timing information in the terrestrial broadcast signal, which can be used in conjunction with a signature to ensure the alert is not spoofed (i.e. someone is transmitting a fake broadcast with an old alert to fool (spoof) receivers).

In one embodiment, the signal analyzer 116*a* determines that the received terrestrial broadcast signal encodes alert data and the signal analyzer 116*a* transmits at least a portion of the alert data to a notification engine 112, which may be either the notification engine 112*a* on the same device 104*a* as the signal analyzer 116*a* or a notification engine 112 executing on at least one other device 104 in the plurality of devices. The signal analyzer 116*a* may transmit all of the alert data to the notification engine 112. Alternatively, the signal analyzer 116*a* may transmit a subset of all of the alert data; for example, and without limitation, the signal analyzer 116*a* may transmit an indication of the type of alert, a location to which the alert applies, and a date and time during which the alert is applicable.

The method 200 includes receiving, by a second device in the plurality of devices in the mesh network, a satellite transmission identifying a location of the second device (204). The satellite transmission signal receiver 108*b* may receive the satellite transmission; for example, the satellite transmission signal receiver 108*b* may receive a GPS signal. The satellite transmission signal receiver 108*b* may provide the received signal to a notification engine 112, either on the second device 104*b* or on another device 104 in the plurality of devices. The satellite transmission signal receiver 108*b* may transmit, or direct the device 104*b* to transmit, to at least the third device 104*c* in the plurality of devices 104, a notification of receipt of the satellite transmission identifying the location of the second device. The satellite transmission signal receiver 108*b* may generate a description of data within the received signal and transmit the generated description to the notification engine 112; for example, and without limitation, the received signal may provide data including GPS coordinates for the location of the device 104*b* and the satellite transmission signal receiver 108*b* (or the signal analyzer 116) may extract the GPS coordinates from other information included in the signal for forwarding to other devices 104. The satellite transmission signal receiver 108*b* may transmit, or direct the device 104*b* to transmit, to each of the devices 104 in the plurality of devices 104, a notification of receipt of the satellite transmission identifying the location of the second device.

In some embodiments, each device 104 shares location information as soon as the device 104 receives the location information. Similarly, each device 104 may share an indication that the device 104 has reception of a terrestrial broadcast signal with each of the other devices 104. When a device 104 receives an alert via the terrestrial broadcast signal, the device 104 may check to determine whether the geography of the device 104 matches an area to which the alert applies; if the alert applies to the location of the device 104 receiving the alert, the device may indicate the alert state via its own notification engine 112 and pass the alert onto the mesh network 102 so other devices can do the same. In some embodiments, other devices receiving the alert need not check the geography to determine if the alert applies. Alternatively, in other embodiments, each device 104 checks the geography to determine and/or confirm whether the alert applies to an area in which the mesh network 102 is installed.

Although FIG. 2 describes the process of receiving the terrestrial broadcast signal before the process of receiving the satellite transmission, it will be understood by those of ordinary skill in the art that this could be reversed with the process of receiving the satellite transmission occurring prior to the process of receiving the terrestrial broadcast signal. As those of ordinary skill in the art will understand, it is possible for signals to be received at one point in time and then dropped; the device 104 may, in some embodiments, constantly be searching for terrestrial broadcast signal even after having received a first terrestrial broadcast signal and a first satellite transmission—for example if the device 104 loses either signal or in cases where the device 104 receives a first terrestrial broadcast signal and then receives a second terrestrial broadcast signal subsequent to the receiving of the satellite transmission.

The method 200 includes confirming, by a notification engine executed by a third device in the plurality of devices in the mesh network, receipt of both the satellite transmission and alert data encoded in the terrestrial broadcast signal (206). In one embodiment, the notification engine 112 determines that the encoded alert data includes an indication that an alert applies to the identified location of the second device and determines to activate the at least one alert module based upon the determination that the alert applies to the identified location of the second device. For example, the notification engine may determine that the alert data includes an identifier of a region to which the alert applies and that the region is the same as (or within) a region identified by the satellite transmission signal receiver 108*b* as the region of the device 104*b*. The alert data may include at least one polygon identifying an area to which the alert applies and the GPS data may be used to calculate whether the mesh network 102 is located inside the at least one polygon.

The method 200 includes activating, by the notification engine, at least one alert module in the mesh network, upon confirmation of the receipt of both the satellite transmission and the alert data encoded in the terrestrial broadcast signal (208). The notification engine 112*a* may transmit, or direct the device 104*a* to transmit, to each of the devices 104 in the plurality of devices, at least a portion of the alert data. The notification engine 112*a* may transmit, or direct the device 104*a* to transmit, to each of the devices 104 in the plurality of devices, a modified version of the alert data.

Activation of one alert module 110*a* may result in automatic activation of all alert modules no in the plurality of devices 104. In some embodiments, the notification engine 112*a* transmits an instruction to each notification engines 112 of each device 104 in the plurality of devices to activate each alert module no on each device 104. In other embodiments, the notification engine 112*a* directs the device 104*a* to transmit an instruction each device 104 to transmit each alert module no on each device 104.

As indicated above, the alert module no may include functionality for accessing a library of words (stored on, or accessible to, the device 104), selecting one or more words from the library of words and concatenating the selected words to create the audio file for playback. When the notification engine 112 directs the alert module no to play an alert, the alert module no may receive, from the notification engine 112, information for generating an alert. The information from the notification engine 112 may be a portion of the alert data. The information from the notification engine 112 may be all of the alert data. The received information may include, without limitation, an identification of at least one polygon describing an area of a map that is impacted by an earthquake (or will be impacted within a threshold period of time), an identification of a level of impact that will occur at the area of the map described by the at least one polygon, an identification of a location of origination of the earthquake, and a level of signal strength. The alert module 110 may identify within the received information, at least one keyword within the information; the alert module no may access a mapping between keywords and words; the alert module no may identify a word associated with the identified at least one keyword; the alert module 110 may access a library of previously recorded words and select the word associated with the identified at least one keyword for use in creating an audio file that may be played back to generate an alert. By way of example, and without limitation, the alert module 110 may concatenate one or more words to create phrases such as "There is an alert for a strong earthquake in your area" or "There is an alert for a weak earthquake in your area; the earthquake is a magnitude 2 earthquake approaching from the west." The alert module no may play one or more audio files. The alert module no may make a tone (e.g., via a piezoelectric buzzer). The alert module no may combine a plurality of different types of alerts (e.g., make a tone sound and play back one or more audio files). Therefore, using the received information (including some or all of the alert data), the alert module 110 may determine whether a device 104 is within a polygon associated with an active alert, may determine whether the alert is a new alert or an update to a previous alert, identify at least one keyword within the received information, select words for generating an audio file by looking up the at least one identified keyword in a data structure, concatenating the selected words to form the audio file and directing the playback of the audio file (e.g., via a text-to-speech component or play back of the audio file through a media player).

Although described above in terms of concatenating words, the alert module no may alternatively, or additionally, include functionality for selecting and concatenating word fragments (e.g., phonetic components of words).

The system 100 may include a text-to-speech engine (not shown) to generate the audio files.

The alert module 110 may also include functionality for configuring the device 104. By way of example, and without limitation, the alert module no may access a library (or section of a library) containing audio files for configuring the device 104 and play a selected configuration audio file (e.g., via a speaker of the device 104) to allow a user to configure the device 104. Configuration options include, without limitation, options to change message length (e.g., brief or verbose) and options to change language of the alerts (e.g., English or Spanish). When a user enters a configuration mode or engages with a hardware component to trigger entering a configuration mode (e.g., by pushing a button), the alert module no may play at least one audio file to direct the user to take an action that the device 104 can interpret as an instruction to modify a configuration. By way of example, and without limitation, the alert module no may play an audio file that states "To hear alerts in Spanish, push the red button now" or "To hear brief alert messages, push the first button on the left now" or "To hear detailed alert messages, push the largest button now" (what type of hardware component of the device 104 provides for configuration may vary based on the type of the device 104).

As will be understood by those of ordinary skill in the art, the device 104 may be updatable via either the terrestrial TV broadcast or the mesh network (e.g., the device 104 may receive data with which to update the software and/or firmware from a device on the mesh network 102 or via a communication received via the terrestrial broadcast signal receiver 106).

Figure 3:
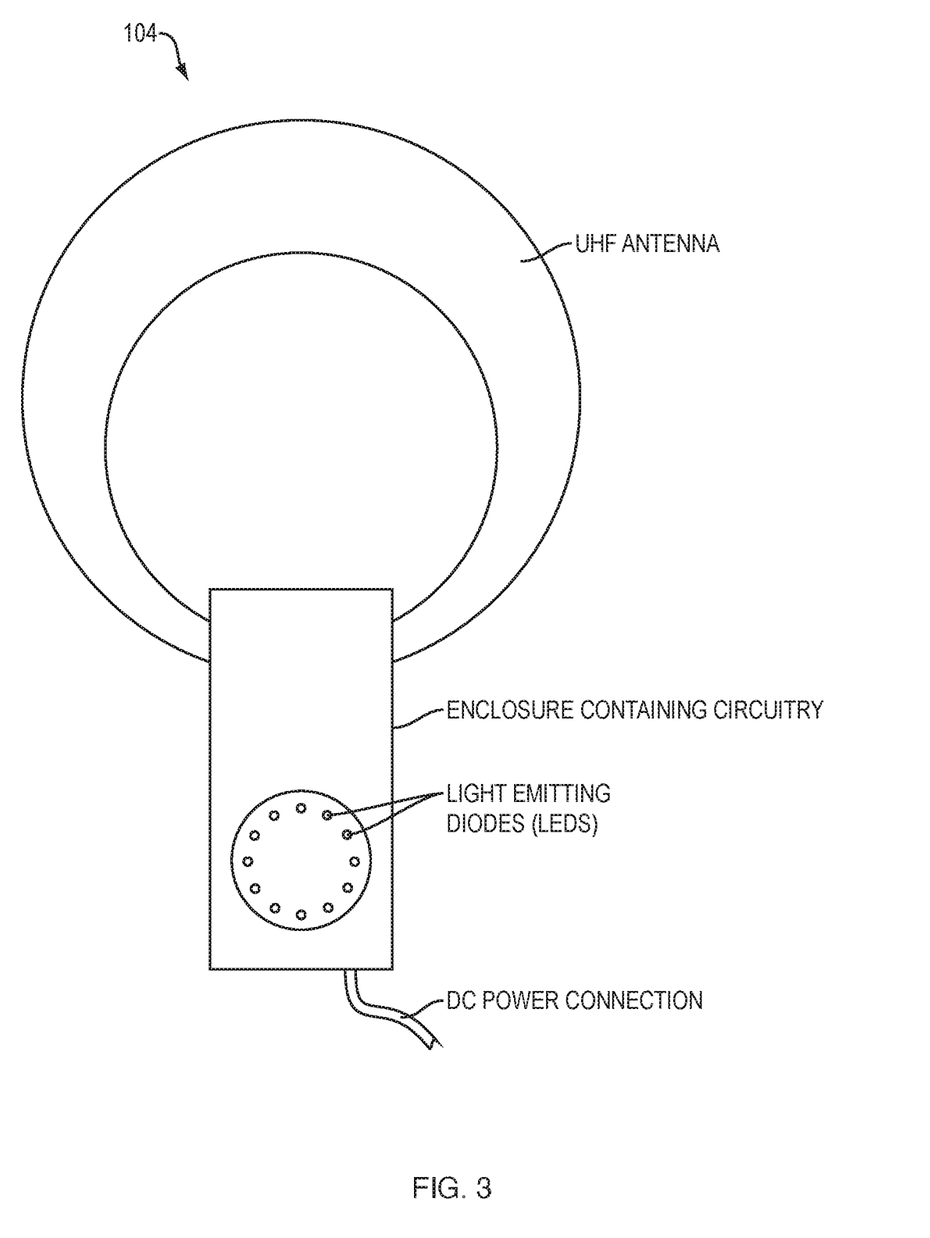
FIG. 3 is a diagram depicting one embodiment of a device for detecting and distributing encoded alert data.

Referring now to FIG. 3, a diagram depicts one embodiment of the devices 104. As shown in FIG. 3, the device 104 may include a terrestrial broadcast signal receiver 106 provided as a UHF antenna. The device 104 may include a plurality of LEDs that may change color, change a pattern of which lights are on at a particular time, or otherwise signal a change from a normal configuration of the lights to indicate an alarm. The device 104 may include a power connection, such as a DC power connection. The device 104 may include an enclosure containing circuitry, including, without limitation, circuitry providing the functionality of the satellite transmission signal receiver 108, the alert module no, the notification engine 112, the mesh network communication device 114, and the signal analyzer 116.

It should be understood that the systems described above may provide multiple ones of any or each of those components and these components may be provided on either a standalone machine or, in some embodiments, on multiple machines in a distributed system. The phrases 'in one embodiment,' 'in another embodiment,' and the like, generally mean that the particular feature, structure, step, or characteristic following the phrase is included in at least one embodiment of the present disclosure and may be included in more than one embodiment of the present disclosure, possibly in combination with other embodiments of the present disclosure. Such phrases may, but do not necessarily, refer to the same embodiment.

The systems and methods described above may be implemented as a method, apparatus, or article of manufacture using programming and/or as a result of implementing engineering techniques to produce software, firmware, hardware, or any combination thereof. The techniques described above may be implemented in one or more computer programs executing on a programmable computer including a processor, a storage medium readable by the processor (including, for example, volatile and non-volatile memory and/or storage elements), at least one input device, and at least one output device (e.g., such as a computer program installed on one of the plurality of devices in the mesh network). Program code may be applied to input entered using the input device to perform the functions described and to generate output. The output may be provided to one or more output devices.

Each computer program within the scope of the claims below may be implemented in any programming language, such as assembly language, machine language, a high-level procedural programming language, or an object-oriented programming language. The programming language may, for example, be LISP, PYTHON, PROLOG, PERL, C, C++, C#, JAVA, or any compiled or interpreted programming language. Each such computer program may be implemented in a computer program product tangibly embodied in a machine-readable storage device for execution by a computer processor.

Method steps of the invention may be performed by a computer processor executing a program tangibly embodied on a computer-readable medium to perform functions of the invention by operating on input and generating output. By way of example, a device 104 may include a microcontroller performing the steps of the method. Suitable processors include, by way of example, both general and special purpose microprocessors. Generally, the processor receives instructions and data from a read-only memory and/or a random access memory. Storage devices suitable for tangibly embodying computer program instructions include, for example, all forms of computer-readable devices, firmware, programmable logic, hardware (e.g., integrated circuit chip; electronic devices; a computer-readable non-volatile storage unit; non-volatile memory, such as semiconductor memory devices, including EPROM, EEPROM, and flash memory devices; magnetic disks such as internal hard disks and removable disks; magneto-optical disks; and CD-ROMs). Any of the foregoing may be supplemented by, or incorporated in, specially-designed ASICs (application-specific integrated circuits) or FPGAs (Field-Programmable Gate Arrays). A computer can generally also receive programs and data from a storage medium such as an internal disk (not shown) or a removable disk. A computer may also receive programs and data (including, for example, instructions for storage on non-transitory computer-readable media) from a second computer providing access to the programs via a network transmission line, wireless transmission media, signals propagating through space, radio waves, infrared signals, etc.

Having described certain embodiments of methods and systems for detecting and distributing alert data, it will now become apparent to one of skill in the art that other embodiments incorporating the concepts of the disclosure may be used.

What is claimed is:

1. A method for detecting and distributing alert data based upon both receiving alert data encoded in a terrestrial television broadcast transmission and receiving an identification of a location of a device, the method comprising:
   receiving, by a first device in a plurality of devices in a mesh network, a terrestrial broadcast signal including at least one datacast packet;
   receiving, by a second device in the plurality of devices in the mesh network, a satellite transmission identifying a location of the second device;
   determining, by a signal analyzer executed by the first device in the plurality of devices, that the terrestrial broadcast signal encodes alert data;
   transmitting, by the signal analyzer, to a notification engine executed by a third device in the plurality of devices in the mesh network, at least a portion of the alert data;
   confirming, by the notification engine, receipt of both the satellite transmission and the at least a portion of the alert data encoded in the terrestrial broadcast signal; and
   activating, by the notification engine, at least one alert module in the mesh network, upon confirmation of the receipt of both the satellite transmission and the alert data encoded in the terrestrial broadcast signal.

2. The method of claim 1 further comprising:
   determining, by the notification engine, that the encoded alert data includes an indication that an alert applies to the identified location of the second device; and
   determining to activate the at least one alert module based upon the determination that the alert applies to the identified location of the second device.

3. The method of claim 1, wherein activating, by the notification engine, the at least one alert module further comprises transmitting, by the notification engine, to each device in the plurality of devices a modified version of the alert.

4. The method of claim 1 further comprising transmitting, by the first device in the plurality of devices in the mesh network, to at least the third device in the plurality of devices in the mesh network, a notification of receipt of the terrestrial broadcast signal including the at least one datacast packet.

5. The method of claim 1 further comprising transmitting, by the first device in the plurality of devices in the mesh network, to each of the other devices in the plurality of devices in the mesh network, a notification of receipt of the terrestrial broadcast signal including the at least one datacast packet.

6. The method of claim 1 further comprising transmitting, by the second device in the plurality of devices in the mesh network, to at least the third device in the plurality of devices in the mesh network, a notification of receipt of the satellite transmission identifying the location of the second device.

7. The method of claim 1 further comprising transmitting, by the second device in the plurality of devices in the mesh network, to each of the other devices in the plurality of devices in the mesh network, a notification of receipt of the satellite transmission identifying the location of the second device.

8. A system for detecting and distributing alert data based upon both receiving alert data encoded in a terrestrial television broadcast transmission and receiving an identification of a location of a device comprising:
   a mesh network comprising a plurality of devices, wherein each device comprises a terrestrial broadcast signal receiver, a satellite transmission signal receiver, and an alert module;
   a notification engine (i) executed by at least a first of the plurality of devices, (ii) receiving, from a signal analyzer executed by a second of the plurality of devices, a notification that at least the second of the plurality of devices received a terrestrial broadcast signal including at least one datacast packet, subsequent to determination by the signal analyzer that the terrestrial broadcast signal encodes alert data, (iii) receiving a notification that at least a third of the plurality of devices received a satellite transmission identifying a location of the second device, and (iv) confirming receipt of both the satellite transmission and alert data encoded in the terrestrial broadcast signal; and
   an alert module executed by at least one of the plurality of devices, activated by the notification engine, and transmitting an alert based upon the alert data.

9. The system of claim 8, wherein each device in the plurality of devices is enabled with a mesh radio enabling communications between the plurality of devices.

10. The system of claim 8, wherein each device in the plurality of devices is enabled with functionality to receive terrestrial broadcast radio signals.

11. The system of claim 8, wherein each device in the plurality of devices is enabled with functionality to receive terrestrial broadcast television signals.

12. The system of claim 8, wherein each device in the plurality of devices is enabled with functionality to receive cellular transmissions.

13. The system of claim 8, wherein each device in the plurality of devices is enabled with functionality to receive global navigation satellite system (GNSS) signals.

14. The system of claim 8, wherein each device in the plurality of devices executes an instantiation of the notification engine.

15. The system of claim 8, wherein each device in the plurality of devices executes an instantiation of the alert module.

16. The system of claim 8, wherein the alert module includes a strobe light.

17. The system of claim 8, wherein the alert module includes a light emitting diode.

18. The system of claim 8, wherein the alert module includes a piezoelectric buzzer.

19. The system of claim 8, wherein the alert module includes functionality for playing an audio file including the alert.

* * * * *

UNITED STATES PATENT AND TRADEMARK OFFICE
CERTIFICATE OF CORRECTION

Page 1 of 2

PATENT NO. : 11,533,600 B2
APPLICATION NO. : 16/864803
DATED : December 20, 2022
INVENTOR(S) : Steven D. Hastings and Nathan O. Ford It is certified that error appears in the above-identified patent and that said Letters Patent is hereby corrected as shown below:

In the Specification

In Column 3, Line 47, delete "module no" and insert -- module 110 --, therefor.
In Column 4, Line 25, delete "1o4" and insert -- 104 --, therefor.
In Column 4, Line 35, delete "module no" and insert -- module 110 --, therefor.
In Column 4, Line 36, delete "module no" and insert -- module 110 --, therefor.
In Column 4, Line 39, delete "module no" and insert -- module 110 --, therefor.
In Column 4, Line 40, delete "module no" and insert -- module 110 --, therefor.
In Column 4, Line 46, delete "module no" and insert -- module 110 --, therefor.
In Column 5, Line 44, delete "1o8a" and insert -- 108a --, therefor.
In Column 5, Line 45, delete "1144a" and insert -- 114a --, therefor.
In Column 5, Line 48, delete "1o6a" and insert -- 106a --, therefor.
In Column 5, Line 49, delete "1o8a" and insert -- 108a --, therefor.
In Column 6, Line 29, delete "102" and insert -- 104b --, therefor.
In Column 6, Line 29, delete "102" and insert -- 104b --, therefor.
In Column 6, Line 52, delete "module no" and insert -- module 110 --, therefor.
In Column 6, Line 53, delete "module no" and insert -- module 110 --, therefor.
In Column 9, Line 4, delete "module no" and insert -- module 110 --, therefor.
In Column 9, Line 8, delete "module no" and insert -- module 110 --, therefor.
In Column 9, Line 11, delete "module no" and insert -- module 110 --, therefor.
In Column 9, Line 12, delete "module no" and insert -- module 110 --, therefor.
In Column 9, Line 17, delete "module no" and insert -- module 110 --, therefor.
In Column 9, Line 18, delete "module no" and insert -- module 110 --, therefor.
In Column 9, Line 31, delete "module no" and insert -- module 110 --, therefor.
In Column 9, Line 33, delete "module no" and insert -- module 110 --, therefor.
In Column 9, Line 43, delete "module no" and insert -- module 110 --, therefor.
In Column 9, Line 44, delete "module no" and insert -- module 110 --, therefor.
In Column 9, Line 45, delete "module no" and insert -- module 110 --, therefor.
In Column 9, Line 60, delete "module no" and insert -- module 110 --, therefor.
In Column 9, Line 67, delete "module no" and insert -- module 110 --, therefor.

Signed and Sealed this
Fifth Day of December, 2023

Katherine Kelly Vidal
*Director of the United States Patent and Trademark Office*

In Column 10, Line 11, delete "module no" and insert -- module 110 --, therefor.
In Column 10, Line 14, delete "module no" and insert -- module 110 --, therefor.